United States Patent
Jia et al.

(10) Patent No.: US 10,552,837 B2
(45) Date of Patent: Feb. 4, 2020

(54) HIERARCHICAL PROFILING INPUTS AND SELF-ADAPTIVE FRAUD DETECTION SYSTEM

(71) Applicant: MICROSOFT TECHNOLOGY LICENSING, LLC, Redmond, WA (US)

(72) Inventors: Yuting Jia, Redmond, WA (US); Huiying Mao, Blacksburg, VA (US); Shoou-Jiun Wang, Sammamish, WA (US); Cezary Marcjan, Redmond, WA (US); Jayaram N M Nanduri, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 309 days.

(21) Appl. No.: 15/711,150

(22) Filed: Sep. 21, 2017

(65) Prior Publication Data
US 2019/0087821 A1    Mar. 21, 2019

(51) Int. Cl.
*G06Q 20/00* (2012.01)
*G06Q 20/40* (2012.01)
*G06Q 40/02* (2012.01)
*G06N 20/00* (2019.01)
*G06F 16/335* (2019.01)

(52) U.S. Cl.
CPC ....... *G06Q 20/4016* (2013.01); *G06F 16/337* (2019.01); *G06N 20/00* (2019.01); *G06Q 40/02* (2013.01)

(58) Field of Classification Search
CPC .......................... G06Q 20/00; G06Q 20/4016
See application file for complete search history.

(56) References Cited

U.S. PATENT DOCUMENTS

| 5,819,226 A | 10/1998 | Gopinathan et al. |
| 7,263,506 B2 | 8/2007 | Lee et al. |
| (Continued) | | |

OTHER PUBLICATIONS

Beranek, et al., "The Use of Contextual Information to Detection of Fraud on Online Auctions", In Journal of Internet Banking and Commerce, vol. 18, Issue 3, Dec. 2013, 10 pages.
(Continued)

*Primary Examiner* — Scott S Trotter
(74) *Attorney, Agent, or Firm* — Workman Nydegger

(57) ABSTRACT

Embodiments disclosed herein are related determining a risk score for one or more data transactions. Current data transactions that are associated with one or more current attributes are received. Stored data transactions associated with stored attributes are accessed. A plurality of the stored attributes are selected. A first sliding window and a second sliding window are selected. A duration of the second sliding window is longer than a duration of the first sliding window and encompasses the duration of first sliding window. Risk information for those stored data transactions that are associated with the plurality of attributes is determined. The risk information is determined during the duration of both the first and second sliding windows and is indicative of a level fraud that is occurring. The determined risk information and the current attributes are used to generate a risk score for the current data transactions. The current data transactions are approved or rejected based on the risk score.

20 Claims, 9 Drawing Sheets

(56) References Cited

U.S. PATENT DOCUMENTS

| | | |
|---|---|---|
| 7,793,835 B1 | 9/2010 | Coggeshall et al. |
| 8,224,790 B2 | 7/2012 | Leary |
| 8,805,737 B1 | 8/2014 | Chen et al. |
| 2011/0055074 A1 | 3/2011 | Chen et al. |
| 2012/0197802 A1 | 8/2012 | Smith et al. |
| 2014/0180974 A1 | 6/2014 | Kennel et al. |
| 2015/0046332 A1* | 2/2015 | Adjaoute ............... G06N 5/043 705/44 |
| 2016/0253672 A1 | 9/2016 | Hunter et al. |
| 2017/0103340 A1 | 4/2017 | Zoldi et al. |

OTHER PUBLICATIONS

Vlasselaer, et al. "APATE: A novel approach for automated credit card transaction fraud detection using network-based extensions", In Journal of Decision Support Systems, vol. 75, Jul. 31, 2015, pp. 38-48.

\* cited by examiner

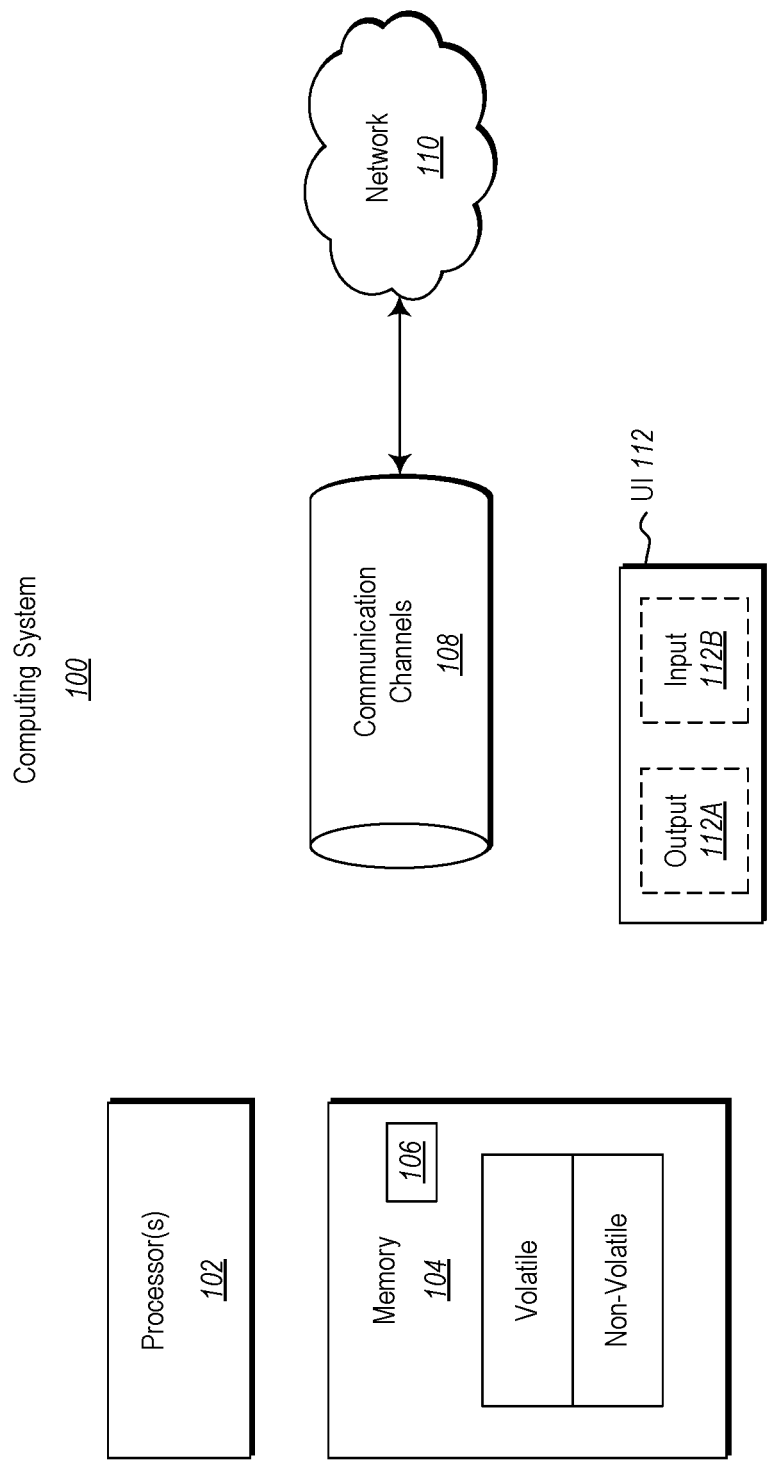

|  | $e_1$ | $e_2$ | ... |
|---|---|---|---|
| WoE($\varepsilon$) | $\ln\left(\frac{N_{11}/N_{\cdot 1}}{N_{10}/N_{\cdot 0}}\right)$ | $\ln\left(\frac{N_{21}/N_{\cdot 1}}{N_{20}/N_{\cdot 0}}\right)$ | ... |
| \$WoE($\varepsilon$) | $\ln\left(\frac{\$_{11}/\$_{\cdot 1}}{\$_{10}/\$_{\cdot 0}}\right)$ | $\ln\left(\frac{\$_{21}/\$_{\cdot 1}}{\$_{20}/\$_{\cdot 0}}\right)$ | ... |
| FR($\varepsilon$) | $N_{11}/N_{1\cdot}$ | $N_{21}/N_{2\cdot}$ | ... |
| \$FR($\varepsilon$) | $\$_{11}/\$_{1\cdot}$ | $\$_{21}/\$_{2\cdot}$ | ... |

*Fig. 7*

| day | D_Score | S_Score | score_diff |
|---|---|---|---|
| 20170209 | 3 | 6 | -3 |
| 20170209 | 10 | 27 | -17 |
| 20170209 | 8 | 28 | -20 |
| 20170209 | 13 | 23 | -10 |
| 20170209 | 3 | 10 | -7 |
| 20170209 | 3 | 10 | -7 |
| 20170209 | 3 | 9 | -6 |
| 20170210 | 99 | 47 | 52 |
| 20170210 | 96 | 4 | 92 |
| 20170210 | 99 | 16 | 83 |
| 20170316 | 98 | 98 | 0 |
| 20170322 | 96 | 94 | 2 |

*Fig. 9*

HIERARCHICAL PROFILING INPUTS AND SELF-ADAPTIVE FRAUD DETECTION SYSTEM

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been, and are being, developed in all shapes and sizes with varying capabilities. As such, many individuals and families alike have begun using multiple computer systems throughout a given day.

For instance, computer systems are now used in ecommerce and the like as individuals increasing perform financial transactions such as making a purchase from various vendors over the Internet. In order to perform the financial transactions, the individuals are typically required to provide a payment instrument such as a credit card or bank account information such as a checking account to the vendor over the Internet. The vendor then uses the payment instrument to complete the transaction.

The process of providing the payment instrument over the Internet leaves the various merchants subject to loss from fraudulent transactions. For example, when a fraudulent payment instrument is used to purchase a product, the merchants often loses the costs associated with the product. This is often because the bank or financial institution that issues the payment instrument holds the merchants responsible for the loss since it was the merchants who approved the transaction at the point of sale where payment instrument is not present.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems and methods for determining a risk score for one or more data transactions. In the embodiments, one or more current data transactions that are associated with one or more current attributes are received. One or more stored data transactions associated with stored attributes are accessed. A plurality of the stored attributes are selected. A first sliding window and a second sliding window are selected. A duration of the second sliding window is longer than a duration of the first sliding window and encompasses the duration of first sliding window. Risk information for those stored data transactions that are associated with the plurality of attributes is determined. The risk information is determined during the duration of both the first and second sliding windows and is indicative of a level fraud that is occurring. The determined risk information and the current attributes are used to generate a risk score for the current data transactions. The current data transactions are approved or rejected based on the risk score.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE FIGURES

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates an example computing system in which the principles described herein may be employed;

FIG. 7 illustrates an example of an entity profile;

FIG. 9 illustrates a chart that shows the performance of a computing system when using entity profiles as an input into a risk determination model and when not using entity profiles as an input into the risk determination model.

DETAILED DESCRIPTION

Figure 2A:
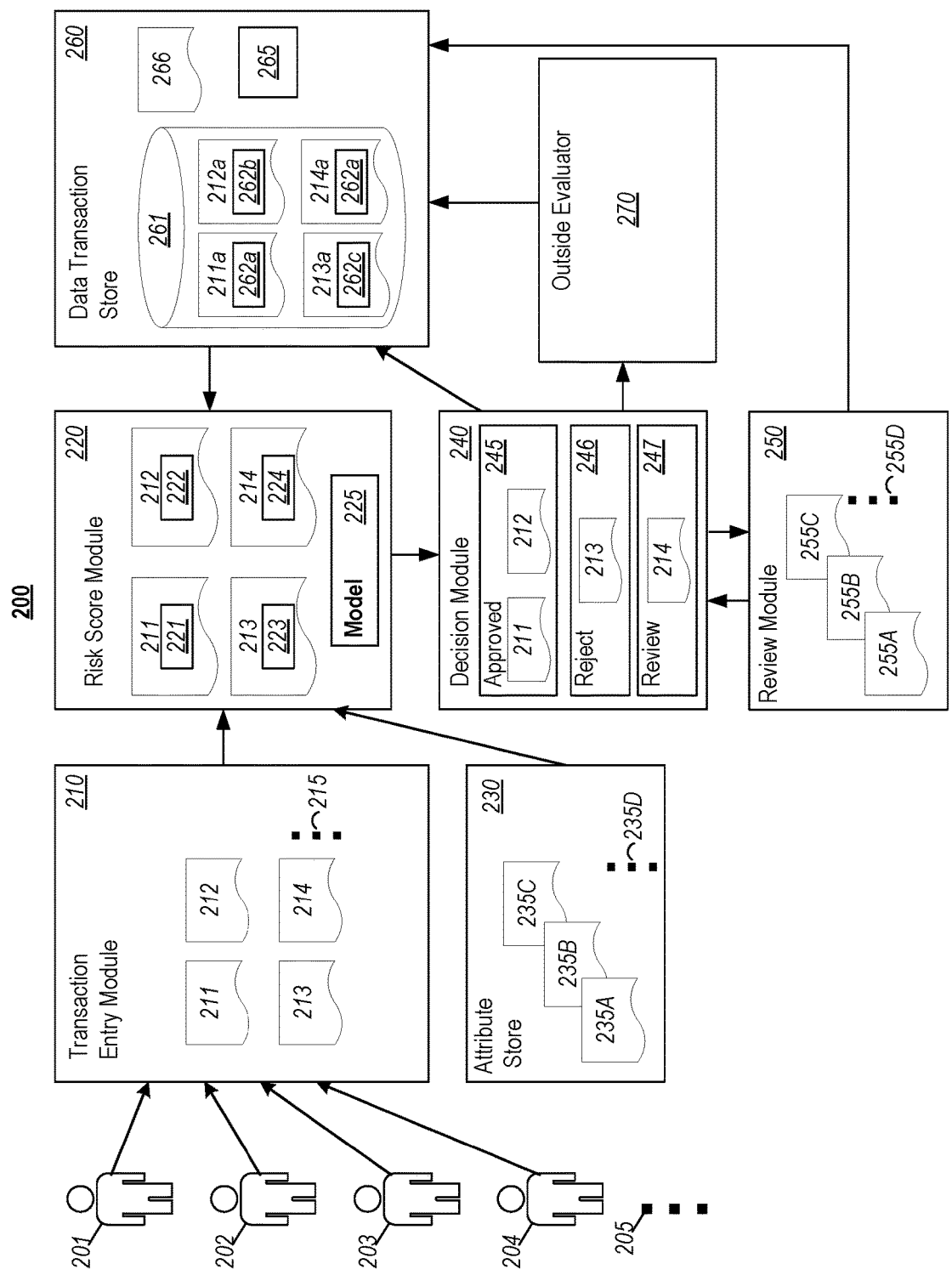
FIG. 2A illustrates a computing system that may implement the embodiments disclosed herein.

Fraud is as old as humanity itself and can take various forms. Moreover, new technology development provides additional ways for criminals to commit fraud. For instance, in e-commerce the information on a card is enough to perpetrate a fraud. As EMV becomes ubiquitous, fraud at physical storefronts is evolving as well—driving a movement from counterfeit card fraud to new account fraud. Growing online retail volume have brought greater opportunity to criminals—pushing fraud to card-not-present channels.

The changes in fraudulent activities and customer behavior are the main contributors to the non-stationarity in the stream of transactions. This situation is typically referred to as "concept drift" and is of extreme relevance to detection models which must be constantly updated either by exploiting the recent supervised samples or by forgetting the outdated information that might be of no further use except misleading. Those fraud solution strategies not updated or revisited frequently enough often lose their predictive accuracy in the long term.

Advantageously, the embodiments disclosed herein are related to providing fraud detection that accounts for "concept drift". This is done by using a profile generation module that trains a risk determination model. The profile generation module generates entity profiles, which may be associated with one or more attributes that are associated with information about the data transactions. The entity profiles may include risk information that is indicative of a level of fraud that is occurring in the data transactions. The entity profiles may be used as an input into the risk determination model so that the risk determination model is able to account for changes in any fraudulent activity.

In the embodiments, one or more current data transactions that are associated with one or more current attributes are received. One or more stored data transactions associated with stored attributes are accessed. A plurality of the stored attributes are selected. A first sliding window and a second sliding window are selected. A duration of the second sliding window is longer than a duration of the first sliding window and encompasses the duration of first sliding window. Risk information for those stored data transactions that are associated with the plurality of attributes is determined. The plurality of attributes in some embodiments is called an entity and may include a product type, email domain, geographical location, device type or the like. The risk information is determined during the duration of both the first and second sliding windows and is indicative of a level fraud that is occurring. In some embodiments, the risk information which is associated with an entity is called an entity profile. As the entity can be organized into an hierarchical structure, such as zip code, city, state, and county, the inputs from the entity profiles may be called hierarchical profiling inputs. The determined risk information, which may be structured as hierarchical profiling inputs, and the current attributes are used to generate a risk score for the current data transactions. The current data transactions are approved or rejected based on the risk score.

There are various technical effects and benefits that can be achieved by implementing aspects of the disclosed embodiments. By way of example, it is now possible to use short term data in the determination of a data transaction risk scores to account for "concept drift". It is also now possible to calibrate and train the risk models. Further, the technical effects related to the disclosed embodiments can also include improved user convenience and efficiency gains.

Some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2B:
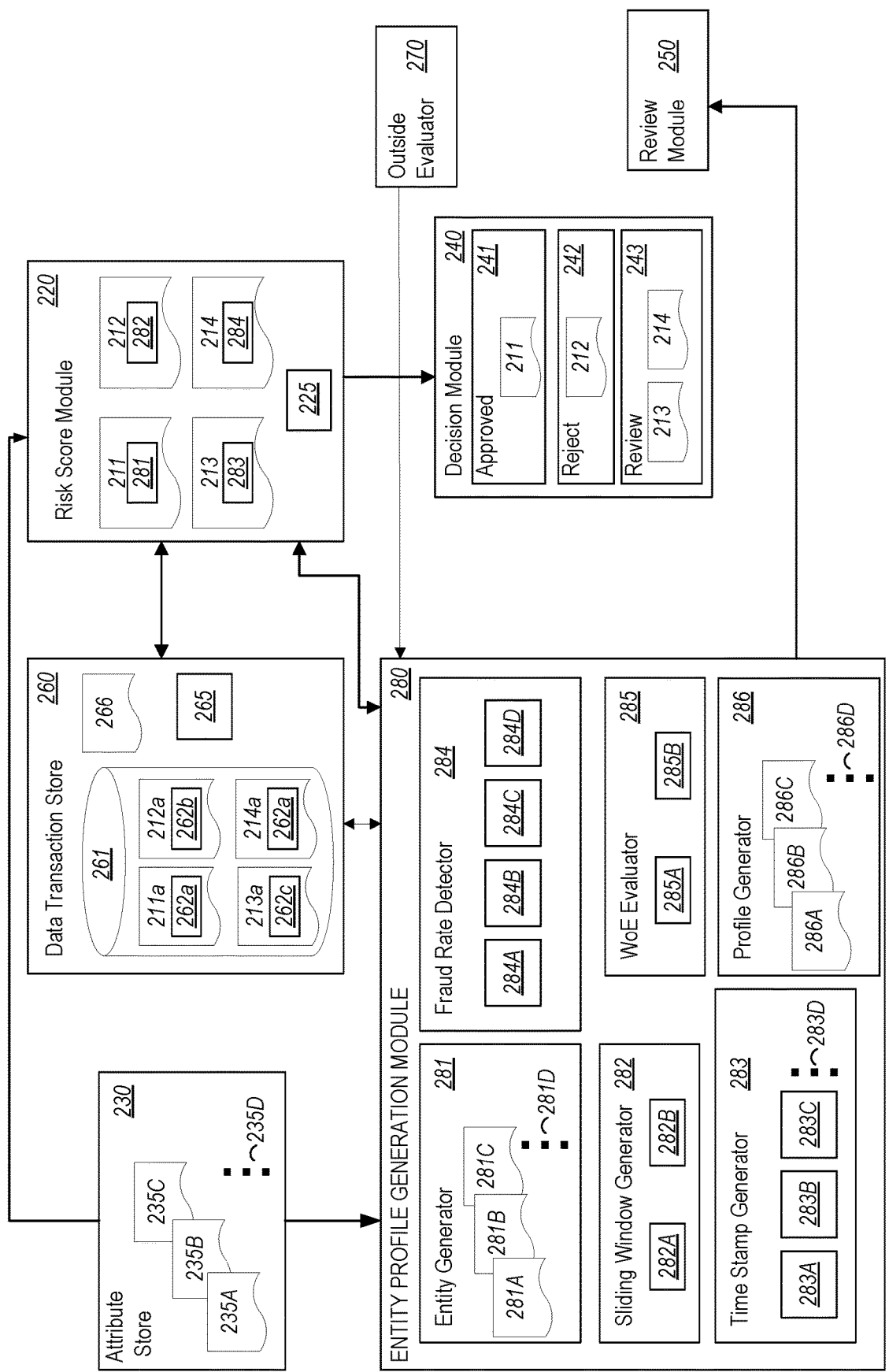
FIG. 2B illustrates an extended view of the computing system of FIG. 2A.

Attention is now given to FIGS. 2A and 2B, which illustrate an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in FIGS. 2A and 2B and some of the components may be combined as circumstances warrant. Although not necessarily illustrated, the various components of the computing system 200 may access and/or utilize a processor and memory, such as processor 102 and memory 104, as needed to perform their various functions.

As shown in FIG. 2A, the computing system 200 may include a transaction entry module 210. In operation, the transaction module 210 may receive input from multiple users 201, 202, 203, 204, and any number of additional users as illustrated by the ellipses 205 to initiate a data transaction that is performed by the computing system 200. For example, the user 201 may initiate a data transaction 211, the user 202 may initiate a data transaction 212, the user 203 may initiate a data transaction 213, and the user 214 may initiate a data transaction 204. The ellipses 215 represent any number of additional data transactions that can be initiated by one or more of the users 205. Of course, it will be noted that in some embodiments a single user or a number of users less than is illustrated may initiate more than one of the transactions 211-215.

The data transactions 211-215 may represent various data transactions. For example, as will be explained in more detail to follow, the data transactions 211-215 may be purchase or other financial transactions. In another embodiments, the transactions 211-215 may be transactions related to clinical or scientific research results. In still, other embodiments, the transactions 211-215 may be any type of transaction that is subject to fraud and is thus able to be characterized as being properly approved, improperly approved, properly rejected, or improperly rejected as a result of the fraud. Accordingly, the embodiments disclosed herein are not related to any type of data transactions. Thus, the embodiments disclosed herein relate to more than purchase or financial transactions and should not be limited or analyzed as only being related to purchase or financial transactions.

The transaction entry module 210 may receive or determine information about each of the data transactions 211-215. For example, if the data transactions 211-215 are purchase or other financial transactions, then the transaction entry module 210 may determine personal information about the user, payment information such as a credit or debit card number, and perhaps the product that is being purchased. If the data transactions are clinical or scientific research data transactions, then the data transaction entry module 210 may determine identifying information about the research such as participant information and result information. The transaction entry module 210 may receive or determine other information about other types of data transactions as circumstances warrant.

The computing system 200 may also include a risk score module 220. In operation, the risk score module 220 may determine a risk score for each of the data transactions 211-215 based on one or more risk determination models 225. The risk scores may be a probability that is indicative of whether a given data transaction is a good transaction that should be approved or is a fraudulent or bad transaction that should be rejected. In one embodiment, the risk determination model 225 may be a gradient boosting decision tree, while in other embodiments the risk determination model 225 may be an artificial neural network or some other type of risk determination model. The risk determination module 225 may also be a machine learning classifier that is trained using aspects of machine learning. Accordingly, it will be appreciated that the embodiments disclosed herein are not limited by a particular type of risk determination model 225.

As mentioned, the risk score module 220 may determine a risk score for each of the data transactions 211-215 based on one or more risk determination models 225. For example, the risk score module may determine a risk score 221 for the data transaction 211, a risk score 222 for the data transaction 212, a risk score 223 for the data transaction 213, and a risk score 224 for the data transaction 214. The risk score module 220 may also determine a risk score for each of the additional data transactions 215. As will be explained in more detail to follow, the risk scores 221-224 may specify if each of the data transactions 211-215 is to be approved (i.e., the data transactions are performed or completed), if the transactions are to be rejected (i.e., the data transactions are not completed or performed) or if further review is needed to determine if the data transaction should be approved or rejected.

In some embodiments, the determination of the risk scores may be based at least in part on one or more attributes (also referred to as "features" or "input variables") that are associated with the data transactions 211-215. For example, as illustrated in FIG. 2A, the computing system may include an attribute store 230. Although shown as being an independent, the attribute store 230 may be part of another element of the computing system 200. In addition, in some embodiments the attributes that are associated with the stat transactions 211-215 may not previously be stored in the attribute store 230, but may be associated with the data transactions by the transaction entry module 210 when the data transaction in input by one of the users 201-205.

As shown, the attribute store 230 may include a first attribute 235a, a second attribute 235b, a third attribute 235c, and any number of additional attributes as illustrated by the ellipses 235d. The attributes may be also be referred to hereinafter as attributes 235.

In the embodiment related to the purchase or other financial transactions, the attributes 235 may be related to the product or service being purchased and to the purchaser of the product and service. For example, the first attribute 235a may specify a purchase price for the product or service, the second attribute 235b may specify the past payment history of the purchaser of the product and service, and a third attribute 235c may specify a profit margin for each transaction for the seller of the product or service. Other attributes 235d such as geographical location where the data transaction was initiated, email domain used to initiate the data transaction, billing address or zip code, device type, or currency used in the data transaction may also be associated with the data transactions. As will be appreciated, the various attributes 235 may be any type of information that provides further detail about a data transaction. Accordingly, the embodiments disclosed herein are not limited by any type of attributes 235 that may be associated with a data transaction. As will be explained in more detail to follow, the attributes 235 may be used to dynamically train the one or more risk determination models 225

In the embodiment related to the to the clinical or scientific research results, the attributes 235 may specify the amount of error that is acceptable, the research goals, and other relevant factors. These may be used by the risk score module 220 as needed. In other embodiments, various other attributes 235 may be used as needed by the risk score module 220.

Figure 3:
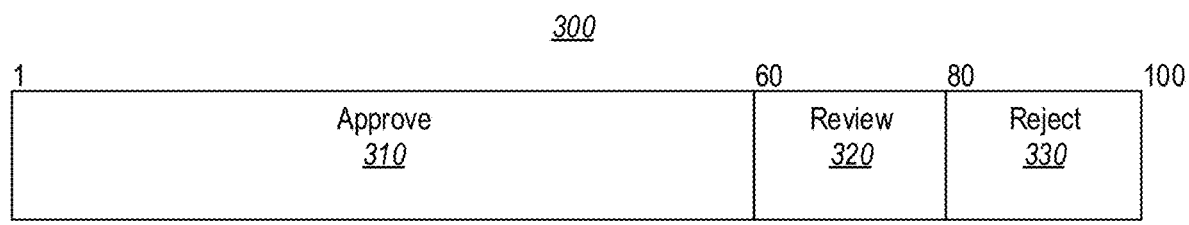
FIG. 3 illustrates an embodiment of a risk score band.

The computing system 200 may further include a decision module 240 that in operation uses the risk scores 221-224 to determine if a data transaction should be approved, rejected or subjected to further review based on the risk score. That is, the decision module 240 may set or otherwise determine a risk score cutoff or boundary for risk scores that will be approved, risk scores that will rejected, and risk scores that will be subjected to further review. For example, FIG. 3 shows risk scores from 1 to 100. As illustrated, those data transactions (i.e., data transactions 211-214) that are assigned a risk score (i.e., risk scores 221-224) between 1 and 60 are included in an approve portion 310 and those data transactions that are assigned a risk score from 80 to 100 are included in a rejected portion 330. However, those data transactions having a risk score between 60 and 80 are included in a review portion 320 that are to be subjected to further review. Thus, in the embodiment the risk score 60 is a first cutoff or boundary and the risk score 80 is a second cutoff or boundary. It will be noted the FIG. 3 is only one example of possible risk scores and should not be used to limit the embodiments disclosed herein.

As illustrated in FIG. 2A, it is shown at 245 that the data transactions 211 and 212 have been approved because the risk scores 221 and 222 were in the risk score band that should be approved. For instance, in relation to the embodiment of FIG. 3 the risk scores 221 and 222 may be between 1 and 60. Accordingly, the data transactions are able to be completed by the computing system 200. The data transaction 213, on the other hand, is shown at 246 as being rejected because the risk score 223 was in the risk score band that should be rejected. For instance, in relation to the embodiment of FIG. 3 the risk score 223 was between 80 and 100. Accordingly, the data transaction is not completed by the computing system 200.

As further shown in FIG. 2A at 247, the data transaction 214 has been marked for further review because the risk score 224 was in the risk score band that should be subjected to further review. For instance, in relation to the embodiment of FIG. 3 the risk score 224 was between 60 and 80. Accordingly, the computing system 200 may also include a review module 250, which may be a computing entity or a human entity that utilizes the review module 240. In operation, the review module 250 receives the data transaction 214 and performs further review on the data transaction to determine if the data transaction should be approved or rejected. For example, the review module may apply one or more additional review criteria 255a, 255b, 255c, and any number of additional review criteria as illustrated by ellipses 255d (hereinafter also referred to "additional review criteria 255"). In some embodiments the additional review criteria 255 may be to review of social media accounts of the initiator of the data transaction, review and/or contact of third parties associated with the initiator of the data transaction, contact with a credit card company that issues a credit card associated with the initiator of the data transaction, or direct contact with the initiator of the data transaction through a phone call, SMS, email, or other real time (or near real time) forms of communication. It will be appreciated that there may be other types of additional review criteria.

Based on the results of the additional review criteria 255, the review module 250 may determine if the data transaction 214 should be approved or rejected. For example, if the additional review criteria indicate that it is likely that the data transition 214 is a valid, non-fraudulent transaction, then the data transaction 214 may be approved. On the other hand, if the additional review criteria indicate that it is likely that the data transition 214 is a fraudulent transaction, the data transaction may be rejected. The determination of the review module may be provided to the decision module 240 and the data transaction 214 may be added to the approved data transactions 245 and allowed to be completed or added to the rejected data transactions 246 and not allowed to be completed.

The computing system 200 may include a data transaction store 260 having a data base 261 that stores the data transactions and information 262a, 262b, 262c, and 262d (hereinafter also referred to as information 262) related to data transactions 211-215 that have been completed or rejected based on the risk scores 221-224 that were assigned to the data transactions by the score module using the risk model 225. The completed data transactions that have information 262 related them as shown as data transactions 211a, 212a, 213a, and 214a in the figure for ease of explanation and may be referred to as stored or historical data transactions as opposed to real time or current data transactions 211-215 that are currently received by the computing system 200.

As shown in FIG. 2A, the transaction store 260 may receive the information 262 regarding whether the data transactions were approved or rejected from the decision module 240. As may be appreciated, the decision module is able to report which of the data transactions were approved, which were sent for further review and which were rejected. The review module 250 may also provide information 262 that specifies which of the data transactions that were subjected to the further review were ultimately approved or rejected. The transaction store 260 may receive the information 262 from other sources as well when circumstances warrant.

In some embodiments, the transaction store 260 may receive information 262 from an outside evaluator 270. The outside evaluator may be a bank, credit card provider, or the like that determines that a data transaction approved by the decision module should have been rejected because the payment source used in the data transaction was fraudulently used or obtained. In such case, the outside evaluator 270 may notify the transaction store 260 that the data transaction should have been rejected, for example by providing chargebacks to the owner of the computing system 200 for the amount of the fraudulent data transactions.

The transaction store 260 may include a training module 265 that is able to use the information 262 to determine if the one or more risk score models 225 are providing a proper risk score. This information may then be used to train the one or more risk score models 225 so as to further refine the model's ability to properly determine the risk scores. The training module 265 may train the one or more risk score models 225 in any reasonable manner.

As may be appreciated, those data transactions, such as data transactions 211 and 212 which were approved by the decision module 240 based on the risk score may be performed by the computing system 200. Thus, in the embodiment where the data transactions are a purchase or other financial transaction the computing system may perform the purchase by receiving payment from the user and then providing the product to the user. In such case, the training module 265 is able to determine if a data transaction was properly approved, which is if the user actually paid for the product. The training module 265 is also able to determine if a data transaction was improperly approved, that is if the user provided a fraudulent payment instrument and received a chargeback from the outside evaluator 270.

However, the data transactions such as data transaction 213 that are rejected by decision module 240 based on the risk score are not actually performed or completed by the computing system 200. Accordingly, to determine if these transactions were properly rejected or not, the transaction store 260 may include or otherwise have access to a sampling module 266. In operation, the sampling module 266 randomly approves a subset of the data transactions that scored to be rejected so that the data transactions are approved. The sampling module 266 may then sample this subset to determine the outcome of the data transaction.

For example, in the embodiment where the data transactions are a purchase or other financial transaction, the sampling module 266 may determine how many data transactions in the subset were properly completed, that is the user paid for the product. Since these were successful data transactions, they were improperly rejected. Likewise, the sampling module 266 may determine how many data transactions in the subset were not properly completed, that is the user paid for the product by a fraudulent means and were thus properly rejected. The sampling module 266 may then use statistical analysis based on the subset to determine if the remaining data transactions that were rejected based on the risk score were properly rejected or not.

In many applications, the information 262 may be collected at the database 261 for a longer period of time and then used by the training module 265 in training the one or more models 225. In one embodiment, the information 262 may be collected over a period of one year. Collecting the data over the period of one year allows for changes in seasonal patterns to be observed in the data. For example, during the holiday season in November and December there may be an increase in data transactions and a corresponding increase in attempted fraud. Although the risk score module 220 and its accompanying one or more risk determination models 225 are generally able to properly detect fraud and thus assign a risk score that properly rejects a fraudulent data transaction, changes often occur in user 201-205 behavior and also in any fraudulent activity that might attempted by one or more of the users 201-205. If such changes, which may be referred to as "concept drift" are not accounted for, then the ability of the risk score module 220 to properly detect fraudulent data transactions may diminish over time. That is, if the risk determination models are unable to account for concept drift, over time their ability to detect fraud is diminished. If this becomes known, it may be exploited by fraudsters as a way to avoid detection of fraudulent transactions.

Advantageously, the embodiments disclosed herein provide for an entity profile generation module 280 that is able to account, at least partially, for concept drift by determining risk information for each data transaction based on the associated attributes 235 that may then be used as inputs to the risk score module 220 to help further train the one or more risk determination models 225. As will be explained in more detail to follow, the determined risk information based on the attributes are able to at least partially measure changes in fraudulent activity.

FIG. 2B illustrates an extended view of the computing system 200. Accordingly, those elements of computing system 200 already discussed in relation to FIG. 2A may not be described further in relation to FIG. 2B. As shown in FIG. 2B, the computing system 200 may include the entity profile generation module 280. The entity profile generation module 280 may include an entity generator 281. In operation, the entity generator 281 is able to generate an entity 281a, 281b, 281c, and any number of additional entities as illustrated by the ellipses 281d. An entity may be a set of the attributes 235 associated with each of the stored data transactions 211a, 212a, 213a, and 214a that are organized in a hierarchical manner by the entity generator 281. That is, as explained the stored data transactions 211a, 212a, 213a, and 214a were associated with various attributes at the time they were stored in the database 261. For example, in one embodiment the entity 281a may include the following attributes hierarchically organized in the following manner: product title, account email domain, billing country zip, device type+currency+Stock Keeping Unit (SKU). The entity 281b may include the following attributes hierarchically organized in the following manner: SKU, SKU group, product category, product type. The entity 281c may include the following attributes hierarchically organized in the following manner: zip code, city, state, country of where the data transaction occurred or of a payment instrument used in the data transaction. In some embodiments, an entity may include as few as one attribute 235 or an unlimited number of attributes 235. Accordingly, the entity generator 281 is able to generate an entity with any desired set of attributes 235 and the embodiments disclosed herein are not limited by the amount of attributes 235 included in an entity.

The entity profile generation module 280 may also include a sliding window generator 282. In operation, the sliding window generator 282 may generate a short term sliding window 282a and a long term sliding window 282b that encompasses the duration of the short term sliding window. As will be explained in more detail to follow, the short term and long term sliding windows are used to define or specify a set of the stored data transactions 211a, 212a, 213a, and 214a for which the risk information will be determined that can then be used as an input to the risk score module to be used by the one or more risk determination module 225. In one embodiment, the short term sliding window 282a may be one week and the long term sliding window 282b may be four weeks. In another embodiment, the short term sliding window 282a may be four weeks and the long term sliding window 282b may be eight weeks. In still other embodiments, the short and long term sliding windows may be different lengths. As mentioned previously, the long term sliding window should encompass the duration of the short term sliding window.

The entity profile generation module 280 may also include a time stamp generator 283. In operation, the time stamp generator may specify one or more time stamps 283a that specify how often the short and long term sliding windows 282a and 282b are applied to the stored data transactions 211a, 212a, 213a, and 214a included in the information 262 so that one or more risk information may be determined as will be explained in more detail to follow. In one embodiment, the time stamps 282a will specify the current time as the time that the sliding windows should be applied to the data transactions. The time stamps 282a may also specify how frequent the sliding windows should be applied. In one embodiment, the frequency is specified to be at least once a day.

The entity profile generation module 280 may also include a fraud rate detector 284 and a Weight of Evidence (WoE) generator 285. In operation, the fraud rate detector 284 may determine an overall fraud rate and a cost fraud rate for transactions within the short term sliding window and the long term sliding window. Both the overall fraud rate and the cost fraud rate are examples of risk information. Likewise, the WoE generator 285 may determine WoE information for transactions within the short term sliding window and the long term sliding window. The WoE generator 285 may determine or calculate a difference between the WoE of the short term sliding window and the long term sliding window. The WoE information is another example of risk information.

The operation of the entity profile generation module 280 will now be explained. The entity generator 281 may generate one or more of the entities 281a-281d in the manner previously described for one or more of the stored data transactions 211a, 212a, 213a, and 214a. The specific entities that are generated may be determined based on which sets of attributes 235 it is deemed important to track. For example, in one embodiment the operator of computing system 200 may determine that it is important to track attributes related to a specific product type that is being marketed in a specific geographical location and that is being purchased using a specific email domain. In addition, the sliding window generator 282 may generate the short term sliding window 282a and the long term sliding window 282b. As described above, the length of the long term sliding window should encompass the length of the short term sliding window so that any concept drift that occurs during this time period may be detected and used in training the one or more risk determination models 225.

As shown in FIG. 2B, the entity profile generation module 280 may access the stored information 262 about the accepted and rejected stored data transactions 211a, 212a, 213a, and 214a from the data transaction store 260. It will be noted that the information 262 in the database 261 may frequently be updated as information is received from the outside evaluator 270. That is, since there is a lag in the time that outside evaluator 270 provides the information that a previously approved data transaction should actually have been rejected, the information 262 may change over time. Thus, some of the information 262 associated with some of the stored data transactions will be more complete or more up-to-date than for others of the stored data transactions.

The entity profile generation module 280 may then apply at the time stamp 283a the short term sliding window 282a and the long term sliding window 282b to those data transactions 211-215 that are included in the information 262 that have been confirmed as being approved or rejected that are associated with the various attributes that comprise an entity of interest. In other words, the entity profile generation module 280, starting at the time specified by the time stamp 283a, will find and group all the stored data transactions 211a, 212a, 213a, and 214a that are confirmed as being approved or rejected that occurred within the time period of the short term and long term sliding windows. The entity profile generation module 280 may then select one or more entities of interest and may determine those stored data transactions 211a, 212a, 213a, and 214a within the sliding windows that are associated with a particular entity of interest so that the risk information may be determined. The risk information may be determined for each of the entities 281a-281d or may be determined for a subset of the entities.

Figure 4:
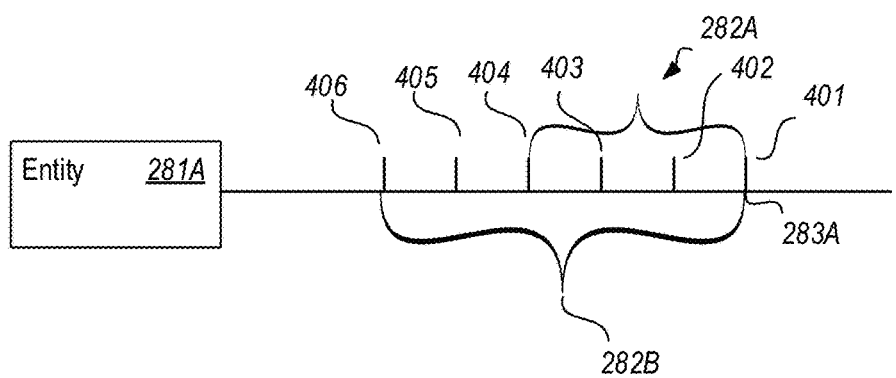
FIG. 4 illustrates an example of a short term and long term sliding window.

FIG. 4 shows an example embodiment of this process when the entity of interest is the entity 281a. As also shown, starting at the time specified by the time stamp 283a, the short term sliding window 282a extends back in time for its specified length and the long term sliding window 282b also extends back in time for its specified length, which also encompasses the length of the short term sliding window 282a. For example, in one embodiment the short term sliding window may have a length of four weeks and the long term sliding window may have a length of eight weeks.

FIG. 4 also shows that data transactions 401-404, which correspond to the confirmed stored data transactions 211a, 212a, 213a, and 214a included in the information 262, have been found and grouped in the short term sliding window 282a. This means that the data transactions 401-404 are associated with a set of attributes corresponding to the entity 281a. In the embodiment where the short term sliding window is set to be four weeks in length, the data transactions 401-404 are those data transactions that are associated with the set of attributes corresponding to the entity 281a during the most recent four weeks from the time specified by the time stamp 283a.

Likewise, the data transactions 401-404 are also included in the long term sliding window 282b. In addition, the long term sliding window 282b also includes the data transactions 405 and 406, which also correspond to the confirmed stored data transactions 211a, 212a, 213a, and 214a included in the information 262, and which also are associated with a set of attributes corresponding to the entity 281a. As mentioned above, there is a lag in the time that outside evaluator 270 provides the information 262 to the data transaction store 260 specifying those stored data transactions 211a, 212a, 213a, and 214a that were approved but that should have been rejected as they were fraudulent data transactions. Thus, any data transactions associated with any updated information 262 received from the outside evaluator 270 after the lengths short or long term sliding windows have been determined may not be included in the short or long term sliding windows. Accordingly, in most embodiments the long term sliding window 282b will include more data transactions than the short term sliding window since there will be more time for the information 262 in the data transaction store to be updated. In the embodiment where the long term sliding window is set to be eight weeks in length, the data transactions 401-406 are those stored data transactions 211a, 212a, 213a, and 214a that are associated with the set of attributes corresponding to the entity 281a during the most recent eight weeks from the time specified by the time stamp 283a.

Once the various data transactions 401-406 that are associated with the set of attributes corresponding to the entity 281a have been determined and grouped within the short and long term sliding windows 282a and 282b, the risk information may be determined by the entity profile generation module. In one embodiment, the fraud rate detector 284 may determine an overall fraud rate for all data transactions within both of the sliding windows and may also determine a fraud rate for all data transactions within the short term sliding window 282a and long term sliding window 282b that are associated with the entity 281a. This process will now be explained.

In one embodiment, the fraud rate detector 284 may determine an overall fraud rate 284a for all of the data transactions within both of the sliding windows. This overall fraud rate is an example of the risk information. For example, in the embodiment the overall fraud rate may be determined by the following equation #1, which divides the number of fraudulent data transactions by the total number of data transactions.

$$\text{overall } FR = \frac{\text{\# of fraud within sliding window}}{\text{\# of total transactions within sliding window}}$$

In some embodiments, an overall dollar weighted fraud rate 284b may also be determined. This type of risk information specifies the fraud rate in terms of money. This may be determined by the following equation #2.

$$\text{overall } \$FR = \frac{\$ \text{ of fraud within sliding window}}{\$ \text{ of total transactions within sliding window}}$$

The fraud rate detector 284 may also determine a fraud rate 284c and dollar weighted fraud rate 284d for those data transactions in both the sliding windows that are associated with the entity of interest, such as the entity 281a. For example, suppose a frequency table and dollar weighted frequency table within a one of the sliding windows 282a or 282b is shown as the following in Table 1, where Y=1 indicates a bad data transaction (for example a fraudulent transaction) and Y=0 indicates a good data transaction (for example a non-fraudulent transaction).

TABLE 1

|  | $e_1$ | $e_2$ | ... | $e_1$ | $e_2$ | ... |
|---|---|---|---|---|---|---|
| Bad Y = 1 | $N_{11}$ | $N_{21}$ | ... | $N_{11}$ | $N_{21}$ | ... |
| Good Y = 0 | $N_{10}$ | $N_{20}$ | ... | $N_{10}$ | $N_{20}$ | ... |
| Total | $N_{1.}$ | $N_{2.}$ | ... | $\$_{1.}$ | $\$_{2.}$ | ... | where $e_1, e_2, \ldots$ are values of entity E (such as entity 281a), $N_{1.}, N_{2.}, \ldots$ represents the total number of transactions for $e_1, e_2, \ldots$ and $\$_1, \$_2, \ldots$ represents the total dollar amount. Then, the using equations #1 and #2 shown above, the fraud rate detector may determine the overall fraud rate 284c and dollar weighted fraud rate 284d for the entity E as shown below in Table 2. It will be noted that the overall fraud rate 284c and dollar weighted fraud rate 284d for the entity E is determined for both the short term sliding window 282a and the long term sliding window 282b. Thus, while only one example of Table 2 is shown for ease of explanation, in operation the overall fraud rate 284c and dollar weighted fraud rate 284d is determined during both sliding windows.

TABLE 2

|  | $e_1$ | $e_2$ | ... |
|---|---|---|---|
| FR(E) | $\dfrac{N_{11}}{N_{1.}}$ | $\dfrac{N_{21}}{N_{2.}}$ | ... |
| \$FR(E) | $\dfrac{\$_{11}}{\$_{1.}}$ | $\dfrac{\$_{21}}{\$_{2.}}$ | ... |

Figure 5:
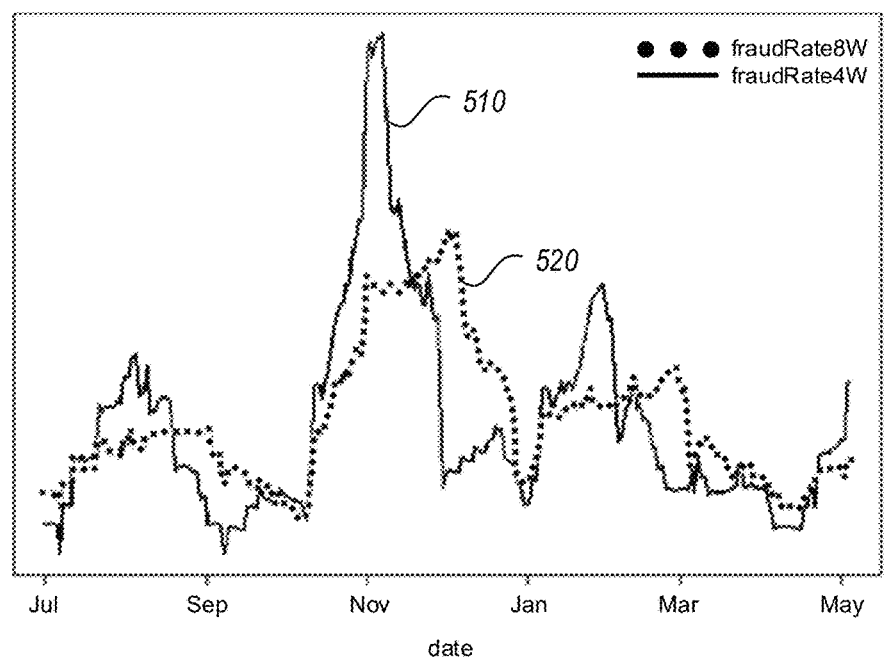
FIG. 5 illustrates an example of fraud rate and changes at different observation dates.

FIG. 5 shows an example of how the determining the fraud rate over changing observation dates using both the sliding short term and long term windows 282a and 282b is able to detect concept drift. As shown in the FIG. 5, line 510 corresponds to a fraud rate determined for an entity, such as entity 281a, which tracked a particular product being sold during the short term sliding window 282a that was four weeks in length over the changing observation dates of shown the X-axis. The line 520 corresponds to a fraud rate determined during the long term sliding window 282b that was eight weeks in length over the same changing observation dates. As shown in the figure, the fraud rate determined using the short and long term sliding windows increased significantly between October and February, thus showing a potential fraudulent attack that may not have been detected without the use of the entity profile generation module. This figure also shows that the potential fraudulent attack was most intense during the short term sliding window duration during this time period as line 510 is spikes during this time period.

The WoE evaluator 285 may also determine a WoE 285a for both the short term sliding window 282a and the long term sliding window 282b. For example, in one embodiment the WoE 285a may be determined by the following equation #3, where Y=1 indicates a bad data transaction and Y=0 indicates a good data transaction.

$$\ln\left[\frac{p(E \mid Y = 1)}{p(E \mid Y = 0)}\right]$$

Suppose $e_1, e_2, \ldots$ are values of entityE, such as entity 281a. Then, within a sliding window 282a or 282b, the frequency table and dollar weighted frequency table is shown as the following table 3:

TABLE 3

|  | $e_1$ | $e_2$ | ... | Total |
|---|---|---|---|---|
| Bad (Y = 1) | $N_{11}$ | $N_{21}$ | ... | $N_{.1}$ |
| Good (Y = 0) | $N_{10}$ | $N_{20}$ | ... | $N_{.0}$ |
| Bad (Y = 1) | $\$_{11}$ | $\$_{21}$ | ... | $\$_{.1}$ |
| Good (Y = 0) | $\$_{10}$ | $\$_{20}$ | ... | $\$_{.0}$ | where $N_{11}$ represents the number of fraud transactions for $e_1$ and $\$_{11}$ represents the dollar amount of fraud transactions for $e_1$. $N_{.1}$ is the number of fraudulent data transactions within the sliding window. Then, the calculation for WoE 285a and dollar weighted WoE 285b for entity E is shown below in Table 4. It will be noted that the WoE 285a and dollar weighted WoE 285b for the entity E is determined for both the short term sliding window 282a and the long term sliding window 282b. Thus, while only one example of Table 4 is shown for ease of explanation, in operation the WoE 285a and dollar weighted WoE 285b is determined during both sliding windows.

TABLE 4

|  | $e_1$ | $e_2$ | ... |
|---|---|---|---|
| WoE(E) | $\ln\left[\dfrac{N_{11}/N_{.1}}{N_{10}/N_{.0}}\right]$ | $\ln\left[\dfrac{N_{21}/N_{.1}}{N_{20}/N_{.0}}\right]$ | ... |
| \$WoE(E) | $\ln\left[\dfrac{\$_{11}/\$_{.1}}{\$_{10}/\$_{.0}}\right]$ | $\ln\left[\dfrac{\$_{21}/N_{.1}}{\$_{21}/N_{.0}}\right]$ | ... |

When referring to entity level, WoE is a distribution. It has measure for every value of E. WoE for a particular value of entity, say $e_1$, WoE($e_1$) is the log of odds ratio between $e_1$ and overall level as shown in in equation #4 below:

$$WoE(e_1) = \ln\left[\frac{N_{11}/N_{.1}}{N_{10}/N_{.0}}\right] = \ln\left[\frac{N_{11}}{N_{10}}\right] - \ln\left[\frac{N_{.1}}{N_{.0}}\right]$$

Figure 6:
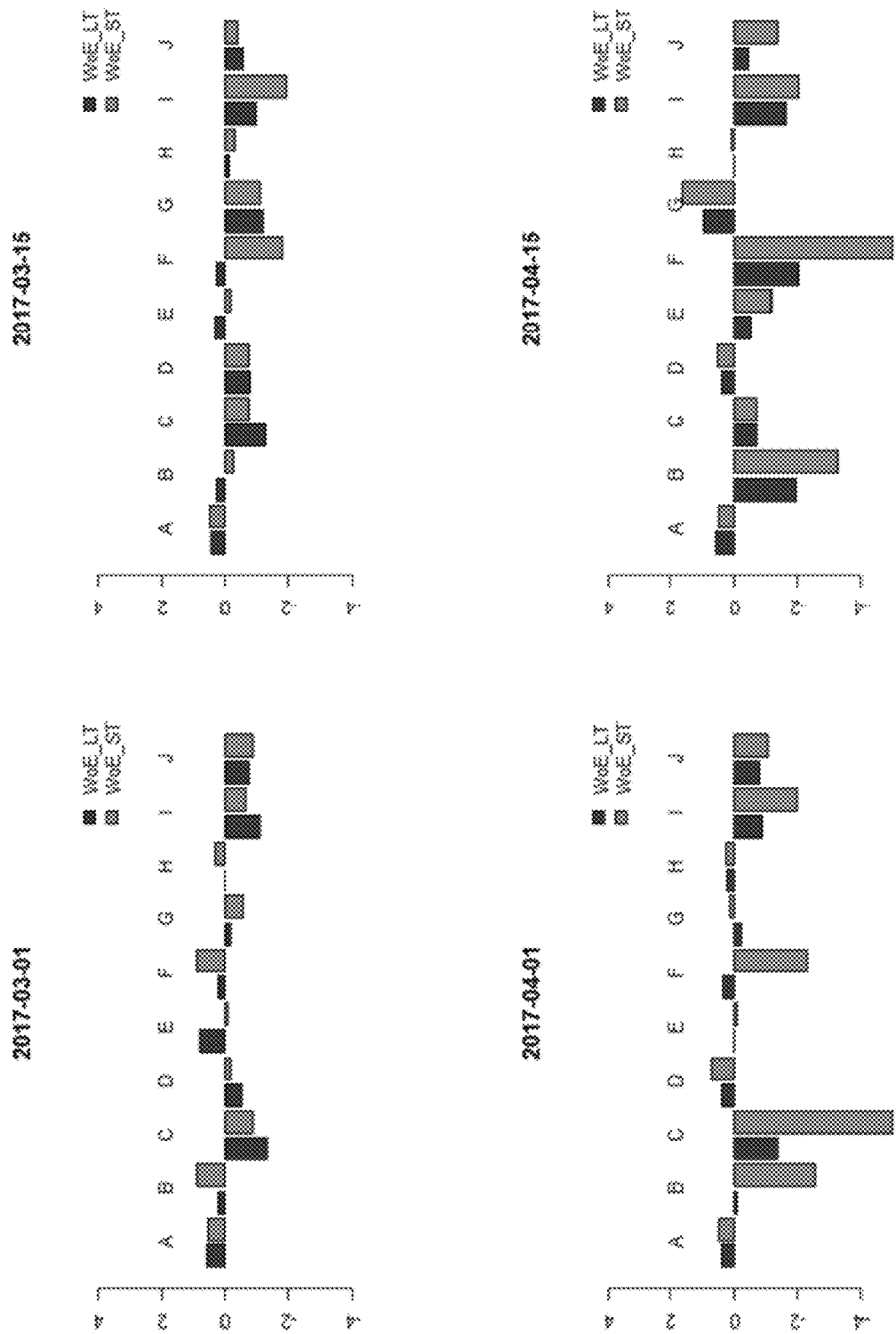
FIG. 6 illustrates an example of Weight of Evidence (WoE)

When WoE($e_1$)>0, the odds of $e_1$ having fraud is higher than the average. Conversely, when WoE($e_1$)<0, $e_1$ is less attacked within this sliding window as compared to the average. Accordingly, WoE provides evidence of where the target of fraudster goes. For example, as shown in FIG. 6, suppose product is the entity of interest, which has 10 values in the market: product A-product J. As shown in the figure, Products A and B have a WoE above zero for both their long term sliding window (shown as the filled in boxes) and short term sliding window(shown as the clear boxes) at the initial date of determining the WoE. This is indicative of a fraud attack occurring. Note, that over time the WoE for Product B for both the long and short term sliding windows drops below zero, indicating that the fraud attack has ceased. However, for Product G, the opposite occurs as initially the WoE values for both sliding windows are below zero, but then move to above zero, indicating that a fraud attack may be now be occurring. When short term sliding window WoE is higher than long term sliding window WoE, it indicates a more recent fraud attack. In addition, in some embodiments the WoE evaluator 285 is able to take a difference between the WoE of the short term sliding window and the long term sliding window. A positive difference between long term sliding window WoE and short term sliding window WoE is a reflection the severity of the fraud attack.

The entity profile generation module 280 may also include a profile generator 286. In operation, the profile generator 286 may generate a number of entity profiles 286a, 286b, 286c, and any number of additional entity profiles as illustrated by the ellipses 286d. The entity profiles 286a-286d are a collection of the risk information for each entity such as fraud rate 284c, dollar weighted fraud rate 284d, WoE 285a and dollar weighted WoE 285b determined during both the short term sliding window 282a and the long term sliding window 282b. In other words, an entity profile is generated for risk information determined during the short term sliding window 282a and a separate entity profile is determined for the risk information determined during the long term sliding window 282b.

For example, FIG. 7 shows an example of an entity profile 286a for given values of an entity, such as entity 281a, that includes risk information determined during either the short term sliding window 282a or the long term sliding window 282b. As shown in the figure, the entity profile 286a includes the risk information 284c, 284c, 285 a, and 282b previously described. Although not illustrated, the entity profile 286a may also include the overall fraud rate 284a and overall dollar weighted fraud rate 284b previously described. It will also be noted that the entity profile 286a (as well as the entity profiles 286b-286d) may also include additional information that is not illustrated.

The profile generator 286 may provide the various entity profiles 286a-286d as inputs to the risk score module 220 to be used in training the one or more risk determination models 225. That is, the profile generator 286 may provide an entity profile for each short term sliding window and each long term sliding window where risk information was determined. In one embodiment, the risk score module 220 may then use at least the entity profiles to associate the risk information specified in each entity profile with any newly received (i.e., current or real time) data transactions 211-215 that have been received by the computing system 200 from the time stamp 283a to the second time stamp 283b that are associated with attributes that are included in the entity profiles. In other words, the entity profiles for both the short and long term sliding windows are provided as inputs to the risk score module 220. In addition, the attributes 235 that are associated with the newly received data transactions 211-215 may also be used as inputs to the risk score module 220 in the manner described previously. The risk score module is then able to associate any of the risk information included in the entity profiles with newly received data transactions 211-215. In this way, the new received data transactions become associated with risk information that is more up to date, since it should include the most up to date information from the outside evaluator 270, then if the profile generator module 280 was not implemented.

Once the risk information has been associated with the recently received data transactions 211-215, the risk score module 220 may use the associated risk information and the attributes 235 associated with the newly arrived data transactions 211-215 to train the one or more risk determination models 225. For example, the risk score module may use the associated risk information to determine if concept drift is occurring indicating that a fraudulent attack may be occurring. When a fraudulent attack is determined to be occurring, the risk score module may take this into account when assigning a risk score to each incoming data transaction. A data transaction having attributes associated with the profile entities that may have received a risk score in the approved band may now be assigned a risk score in the reject band or further review band.

Accordingly, based on the updated training of the one or more risk determination models 225, a new risk score may be determined for the newly arrived data transactions 211-215 that more fully takes any occurring concept drift into account. For example, the score module 220 may determine a risk score 281 for the newly arrived data transaction 211, a risk score 282 for the newly arrived data transaction 212, a risk score 283 for the newly arrived data transaction 213, and a risk score 284 for the newly arrived data transaction 214, all of which may be based on the updated training of the one or more risk determination models 225. The risk score module 220 may also determine a risk score for each of the additional newly arrived data transactions 215 based on the updated training of the one or more risk determination models 225. Like the risk scores 221-224 previously discussed, the risk scores 281-284 may also specify if each of the data transactions 211-215 is to be approved (i.e., the data transactions are performed or completed), if the transactions are to be rejected (i.e., the data transactions are not completed or performed) or if further review is needed to determine if the data transaction should be approved or rejected.

Once the risk scores 281-284 have been determined for each of the data transactions 211-214, the decision module 240 may use the risk scores 281-284 to determine if a data transaction should be approved, rejected or subjected to further review based on these risk scores. That is, the decision module 240 may set or otherwise determine a risk score cutoff or boundary for final risk scores that will be approved, final risk scores that will rejected, and risk scores that will be subjected to further review in a manner similar to that described in relation risk scores 221-224. It will be appreciated that in the embodiments implementing the entity profile generation module 280, the decision module 240 may use the risk scores 281-284 when making the real time decision as to which data transactions to approve, reject, or subject to further review.

As illustrated in FIG. 2B, it is shown at 241 that the data transactions 211 has been approved because the risk score 281 was in the risk score band that should be approved. Accordingly, the data transaction 211 is able to be completed by the computing system 200. The data transaction 213, on the other hand, is shown at 242 as being rejected because the risk score 283 was in the risk score band that should be rejected. Accordingly, the data transaction is not completed by the computing system 200.

As further shown in FIG. 2B at 243, the data transactions 212 and 214 have been marked for further review because the risk scores 282 and 284 were in the risk score band that should be subjected to further review. It will be noted that the data transaction was 212 was approved when the decision module 240 used the risk score 222 as the basis of its decision. However, using the risk score 282 as the basis for the decision, the data transaction is now subject to further review. This shows that using the entity profile generation module 280 to help determine the risk score may result in a different risk score result than if the profile generation module is not used. In this case, it is possible that some form of "concept drift" has crept into the one or more risk determination term models 225 and this has been accounted for by the entity profile generation module 280 when determining the risk score 282.

The review module 250 may receive the data transactions 212 and 214 and performs further review on the data transactions using the additional review criteria 255 to determine if these data transaction should be approved or rejected. This process may be performed in the manner previously described in relation to review module 250.

Figure 8:
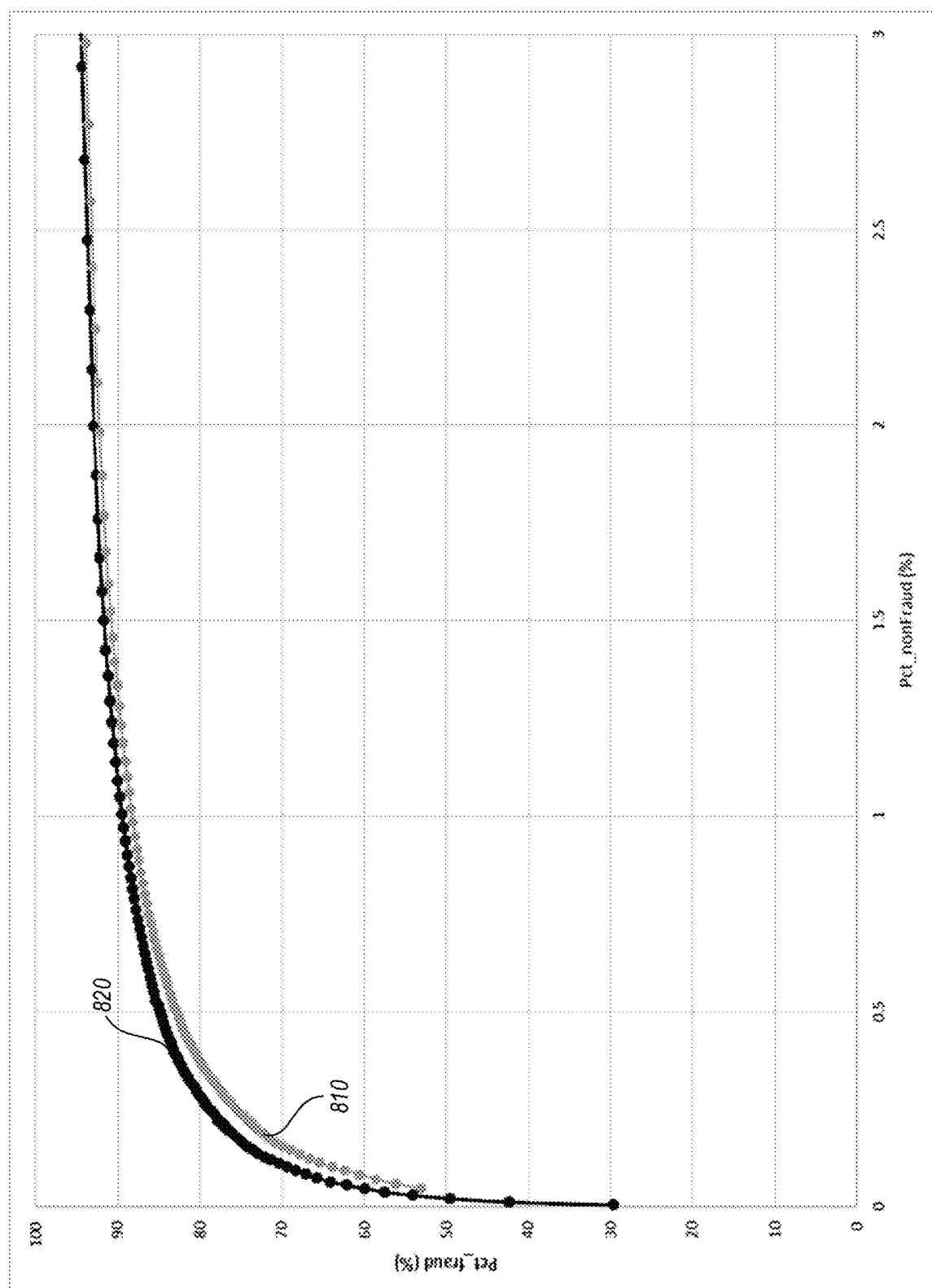
FIG. 8 illustrates a graph that shows the performance of a computing system when using entity profiles as an input into a risk determination model and when not using entity profiles as an input into the risk determination model.

FIG. 8 shows a graph that illustrates that shows the performance of the computing system 200 when including the entity profiles 286a-286d as inputs for the one or more risk determination models 225 and when not including the entity profiles 286a-286d as inputs for the one or more risk determination models 225 FIG. 8 illustrates a percentage of non-fraudulent data transactions which have a risk score about a given score cutoff on the x-axis and a percentage of fraudulent transactions which have a risk score about the given score cutoff on the y-axis. Plot 810 shows the performance of computing system 200 when not including the entity profiles 286a-286d as inputs for the one or more risk determination models 225. Plot 820 shows the performance of the computing system when including the entity profiles 286a-286d as inputs for the one or more risk determination models 225. A comparison of the two plots shows that when including the entity profiles as inputs the one or more risk determination modules 225 are able to better detect fraudulent activity since it will take any concept drift into account as previously described.

FIG. 9 provides further evidence of the advantages of including the entity profiles as inputs to the risk determination models 225. As illustrated in this figure, a score 910 shows the risk score determined by the risk score module 220 when the one or more risk score models 225 do not include the entity profiles as inputs. A score 920 shows the risk score determined by the risk score module 220 when the one or more risk score models 225 include the entity profiles as inputs. The difference between the risk scores is shown at 930. As shown for the four data transactions at 940, the score 910 would be in a range that may result in the approval of these transactions. However, including the entity profile generation module 280 has resulted in risk scores that are now in a range that should result in their rejection. Since concept drift was accounted for, recent fraudulent attacks occurring in these four transactions was caught and the transactions were able to be rejected.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
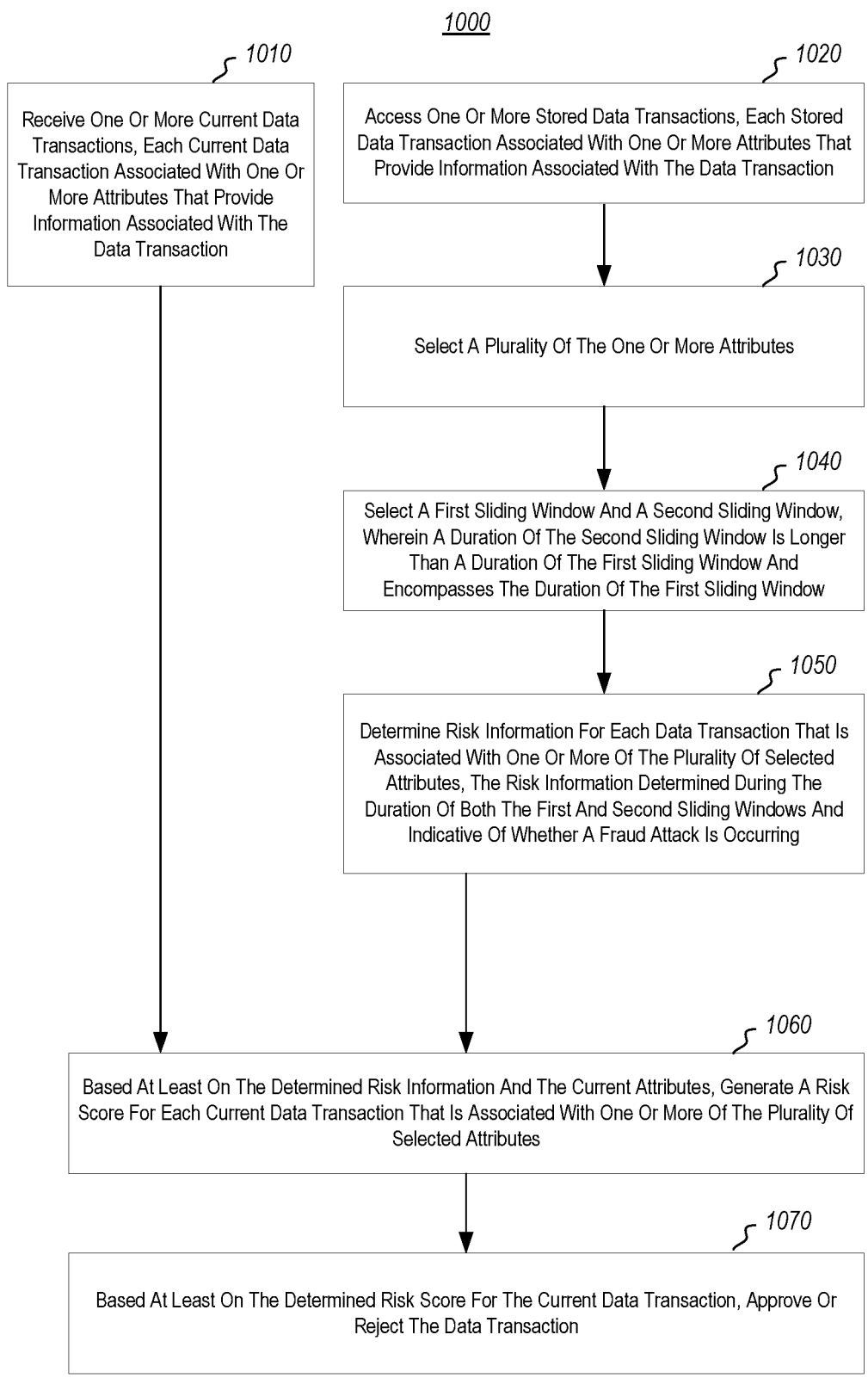
FIG. 10 illustrates a flow chart of an example method for determining a risk score for one or more data transactions.

FIG. 10 illustrates a flow chart of an example method 1000 determining a risk score for one or more data transactions. The method 1000 will be described with respect to one or more of FIGS. 2-9 discussed previously.

The method 1000 includes receiving one or more current data transactions, each current data transaction associated with one or more current attributes that provide information associated with the data transaction (1010). For example as previously described the current or recently received data transactions 211-215 may be received at the risk score module 220 via the transaction entry module 210. The data transactions 211-215 may be any type of data transaction. The current data transactions may be associated with one or more of the attributes 235 as previously described, which may be considered current attributes since they are associated with the current data transactions.

The method 1000 includes accessing one or more stored data transactions, each stored data transaction associated with one or more stored attributes that provide information associated with the stored data transaction (1020). For example as previously described the entity profile generation module 280 may access the stored data transactions 211a, 212a, 213a, and 214a from the data transaction store 260. These stored data transaction are associated with attributes 235 and with information 262 that indicates if the data transactions were properly rejected or accepted.

The method 1000 includes selecting a plurality of the one or more stored attributes (1030). For example, as previously described the profile generation module may select one or more entities, such as entity 281a, which are a set of the plurality of stored attributes associated with the stored data transactions 211a, 212a, 213a, and 214a for use in determining the risk information.

The method 1000 includes selecting a first sliding window and a second sliding window, where a duration of the second sliding window is longer than a duration of the first sliding window and encompasses the duration of the first sliding window (1040). For example, as previously discussed the sliding window generator 282 may select or generate the long term sliding window 282a and the short term sliding window 282b. The long term sliding window 282b may be longer than the short term sliding window 282a and may encompass the duration of the short term sliding window. In one embodiment, the long term sliding window may be eight weeks and the short term sliding window may be four weeks.

The method 1000 includes determining risk information for those data current transactions of the one or more current data transactions that are associated with the selected stored attributes (1050). The risk information is determined during the duration of both the first and second sliding windows and is indicative of whether a fraud attack is occurring. For example, as previously described the fraud rate detector 284 may determine one or more of the overall fraud rate 284a, the overall dollar fraud rate 284b, the fraud rate 284c for a given entity and the dollar fraud rate 284d for the given entity. The WoE evaluator 285 may determine a WoE 285a and a dollar weighted WoE 285b for the given entity. As mentioned, the various fraud rates and the WoEs are examples of the risk information. The risk information is determined during both the long term sliding window 282a and the short term sliding window 282b. As previously described, the risk information is indicative of a level fraud that is occurring in the current data transactions.

The method 1000 includes based at least on the determined risk information and the current attributes, generate a risk score for each data transaction that is associated with one or more of the plurality of selected stored attributes (ac1060). For example, as previously described the profile generator 286 may generate the entity profiles 286a-286d. These entity profiles may be used as input to the risk score module 220 in training the one or more risk determination models 225 so that the models account for any concept drift that would indicate fraud is currently occurring. The risk score module 220 module may then generate the risk scores 281-284.

The method 1000 includes based at least on the determined risk score, approving or rejecting the current data transaction (1070). For example, as previously described the decision module 240 may use the risk scores 281-284 to decide if the current data transactions 211-215 should be accepted or rejected or in some instances sent for further review.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to determine a risk score associated with one or more data transactions, the computing system comprising:
    at least one processor;
    a computer readable hardware storage device having stored thereon computer-executable instructions which, when executed by the at least one processor, configure the at least one processor to:
    receive one or more current data transactions, each current data transaction associated with one or more current attributes that provide information associated with the current data transaction;
    access one or more stored data transactions, each stored data transaction associated with one or more stored attributes that provide information associated with the stored data transaction;
    select a plurality of the one or more stored attributes;
    select a first sliding window and a second sliding window, wherein a duration of the second sliding window is longer than a duration of the first sliding window and encompasses the duration of the first sliding window;
    determine risk information for each stored data transaction that is associated with one or more of the plurality of selected stored attributes, the risk information determined during the duration of both the first and second sliding windows and indicative of a level of fraud that is occurring;
    based at least on the determined risk information and the current attributes, generate a risk score for each current data transaction that is associated with one or more of the plurality of selected stored attributes; and
    based at least on the determined risk score for the data transaction, approve or reject the data transaction.

2. The computing system of claim 1, wherein the duration of the first sliding window is four weeks.

3. The computing system of claim 1, wherein the duration of the second sliding window is eight weeks.

4. The computing system of claim 1, wherein the risk information includes one of an overall fraud rate, an overall dollar fraud rate, a fraud rate or a dollar fraud rate for each data transaction that is associated with one or more of the selected attributes.

5. The computing system of claim 1, wherein the risk information includes a Weight of Evidence (WoE) for each data transaction that is associated with one or more of the selected attributes.

6. The computing system of claim 1, wherein determining the risk information comprises:
    generating one or more profiles for the one or more of the plurality of selected stored attributes, each of the one or more profiles including at least some of the determined risk information.

7. The computing system of claim 6, wherein a profile is generated for the risk information determined during the duration of the short term sliding window and for risk information determined during the duration of the long term sliding window.

8. The computing system of claim 1, wherein generating a risk score for each current data transaction that is associated with one or more of the plurality of selected stored attributes s comprises:
    using the risk information as an input into a risk determination model;
    training the risk determination model based on the input risk information to update the risk determination model; and
    based on the training, causing the updated risk determination model to determine an updated risk score.

9. A method for determining a risk score for one or more data transactions, the method comprising:
    receive one or more current data transactions, each current data transaction associated with one or more current attributes that provide information associated with the current data transaction;
    access one or more stored data transactions, each stored data transaction associated with one or more stored attributes that provide information associated with the stored data transaction;
    select a plurality of the one or more stored attributes;
    select a first sliding window and a second sliding window, wherein a duration of the second sliding window is longer than a duration of the first sliding window and encompasses the duration of the first sliding window;
    determine risk information for each stored data transaction that is associated with one or more of the plurality of selected stored attributes, the risk information determined during the duration of both the first and second sliding windows and indicative of a level of fraud that is occurring;
    based at least on the determined risk information and the current attributes, generate a risk score for each current data transaction that is associated with one or more of the plurality of selected stored attributes; and
    based at least on the determined risk score for the data transaction, approve or reject the data transaction.

10. The method of claim 9, wherein the duration of the first sliding window is four weeks.

11. The method of claim 9, wherein the duration of the second sliding window is eight weeks.

12. The method of claim 9, wherein the risk information includes one of an overall fraud rate or an overall dollar fraud rate.

13. The method of claim 9, wherein the risk information includes one of a fraud rate or a dollar fraud rate for each stored data transaction that is associated with one or more of the selected stored attributes.

14. The method of claim 9, wherein the risk information includes a Weight of Evidence (WoE) for each data transaction that is associated with one or more of the selected attributes.

15. The method of claim 9,
    wherein generating a risk score for each current data transaction that is associated with one or more of the plurality of selected attributes comprises:

using the risk information as an input into a risk determination model;

training the risk determination model based on the input risk information to update the risk determination model; and based on the training, causing the updated risk determination model to determine an updated risk score.

16. The method of claim 9, wherein determining the risk information comprises:

generating one or more profiles for the one or more of the plurality of selected stored attributes, each of the one or more profiles including at least some of the determined risk information.

17. The method of claim 16, wherein a profile is generated for the risk information determined during both the duration of the first sliding window and for risk information determined during the duration of the second sliding window.

18. A computing system for determining a risk score for a plurality of data transactions, the computing system comprising:

at least one processor;

a computer readable hardware storage device having stored thereon computer-executable instructions which, when executed by the at least one processor, cause the processor to instantiate in the hardware storage device the following:

a first module that is configured to:

receive one or more current data transactions, each current data transaction associated with one or more current attributes that provide information associated with the current data transaction;

access a plurality of stored attributes that are associated with one or more stored data transactions, the plurality of stored attributes providing information associated with each stored data transaction of the one or more stored data transactions;

select a first sliding window and a second sliding window, wherein a duration of the second sliding window is longer than a duration of the first sliding window and encompasses the duration of the first sliding window; and determine risk information for each stored data transaction that is associated with one or more of the plurality of selected stored attributes, the risk information determined during the duration of both the first and second sliding windows and indicative of a level fraud that is occurring; and a second module that is configured to:

based on the determined risk information, generate a risk score for each current data transaction that is associated with one or more of the selected stored attributes; and based at least on the determined risk score for the data transaction, approve or reject the data transaction.

19. The computing system of claim 18, wherein the second module generates a risk score by:

using the risk information as an input into a risk determination model;

training the risk determination model based on the input risk information to update the risk determination model; and based on the training, causing the updated risk determination model to determine an updated risk score.

20. The computing system of claim 18, wherein the first module determines the risk information by:

generating one or more profiles for the one or more of the selected stored attributes, each of the one or more profiles including at least some of the determined risk information, wherein a profile is generated for the risk information determined during both the duration of the first sliding window and the second sliding window.

* * * * *